Dec. 6, 1955  G. D. CAMP  2,726,386
SIGNAL DISCRIMINATION IN PULSE RADAR SYSTEMS
Filed Nov. 8, 1951  2 Sheets-Sheet 1

INVENTOR
GLEN D. CAMP
BY
ATTORNEY

United States Patent Office 2,726,386
Patented Dec. 6, 1955

2,726,386

SIGNAL DISCRIMINATION IN PULSE RADAR SYSTEMS

Glen D. Camp, Chevy Chase, Md., assignor to Melpar, Inc., Alexandria, Va., a corporation of New York Application November 8, 1951, Serial No. 255,403

12 Claims. (Cl. 343—17.1)

The present invention relates generally to pulse radar systems, and more particularly to systems for increasing the discrimination attainable in pulse radar systems, as between signal on the one hand, and noise and clutter on the other.

The discrimination against noise and clutter of a pulse radar equipment is controlled by the poorer of the two ratios, signal to noise and signal to clutter. It is therefore advantageous to increase the smaller of these ratios even if this can only be done at the expense of a decrease of the larger. The optimal situation exists when the two ratios are approximately equal. It is entirely possible in accordance with known art to design a radar equipment for which the two ratios signal-to-noise and signal-to-clutter are equal at any one desired and predetermined range. However, the ratios signal-to-noise (S/N), and signal-to-clutter (S/C) have different dependence on range, so that if the relation of the ratios is optimal for any one range, it will not in general be optimal for any other range.

In a microwave radar, noise is of local origin, and hence independent of range. Signal strength at the receiver varies approximately as $1/R^4$, where R is range. Hence S/N varies as $1/R^4$.

Clutter, on the other hand, is an echo signal, and behaves as such, in that clutter signal is a decreasing function of range.

The basic difference between an ordinary target and clutter targets is that the latter may exist over a wide area of space and at all ranges, and may vary on a statistical basis, i. e. are for many cases not fixed; whereas an ordinary target has a definite range and azimuth, and is fixed at least over a reasonably short time interval. If there were only one clutter target at the same range as the real target, S/C would be independent of range, but since the radiant energy beam utilized in pulse radar systems spreads, with range, more and more clutter targets are found as range increases, in general. In surface search from high-altitude aircraft, the variable angle of incidence with the surface of a body of water may weaken the return from clutter targets more than from the actual target, so that for this special case S/C may increase with range. Clutter introduced by rain, sleet and the like depends on the vertical divergence of the radar beam, as well as on its divergence in bearing, while clutter due to conditions at the surface of the earth depend only on divergence of the radar beam in bearing.

A further factor which affects S/C is the pulse length employed in a given radar equipment. It will be clear, on a qualitative basis, that a longer pulse will return clutter echo signals from a greater increment of range straddling the real target range. Hence, S/C decreases with increase of pulse length. On the other hand, increase of pulse length results in increase of S/N for a fixed pulse power, since noise is a function of band width in the R. F. stage of the radar receiver, and this must be made smaller for longer pulses, to obtain optimum S/N.

It follows, from the analysis above provided, that if pulses could be transmitted, from a pulse radar transmitter, of length suitably selected in correspondence with range of the desired target, that optimal $S/N = S/C$ could be obtained for any one range. The difficulty remains that targets may be at a plurality of ranges and that, in any event, target range is often unknown and unpredictable. If, however, received pulses could be adjusted in respect to length, as a function of time, the problem of attaining optimal $S/C = S/N$ could be solved, because the range of any target giving rise to a received signal pulse is readily derivable from the time of reception of the signal pulse.

The problem of compressing an R. F. pulse is remarkably complicated when the pulse is rectangular, i. e. possesses a sharp rise and decay. It is my conception, and an object of the present invention, to utilize R. F. radar pulses which have a rapid rise but a slow exponential decay, i. e. a pulse which has a definite sharp beginning but no end. It can be shown that pulses of such character are susceptible of compression in length by means of simple and practicable circuits, readily controllable in response to a variable or varying control voltage.

In general, conventionally designed radar systems may be employed, in the practice of the present invention, except for the required pulse shape, and the introduction of a pulse compressor into the R. F. or I. F. stage of the radar receivers, the pulse compressor being controllable as a function of time to provide range controlled pulse compression.

The radar equipment may be designed for optimum S/N at maximum range, in the circuits prior to the compressor, for the uncompressed pulse, in which case S/N will increase radically for smaller ranges. If, at the same time, effective pulse duration, which is a function of rate of pulse decay when non-rectangular pulses are employed, is selected for S/C at maximum range which is equal to S/N at the same range, it will be found that S/C, without pulse compression, will not increase at all as rapidly with decreasing range as does S/N. This may be compensated for by transmitting sufficiently long pulses to give $S/N = S/C$ at short range and progressively compressing the received pulses as a function of increasing range, and in accordance with a law of variation which may best be empirically determined for each radar equipment, and in terms of the conditions of use of that equipment, so as to maintain $S/N = S/C$ at ranges out to the maximum range.

It may be expected, in general, that the presence of the circuits required for pulse compression will somewhat decrease S/N, but this merely indicates that maximum range for the system had been set too high. S/N for compressed pulses at all ranges may be somewhat decreased, as S/C is increased, from that which would exist for uncompressed pulses. This effect is, however, of minor significance, since S/N is a rapidly increasing function with decreasing range.

It is, accordingly, a basic object of the present invention to provide a pulse radar equipment utilizing readily compressible pulses.

It is a further basic object of the invention to provide improved performance in pulse radar equipments, by providing pulse compression internally of the radar receiver.

Another object of the invention resides in the provision of a pulse radar system utilizing transmitted pulses having sharp rise times and slow decay times.

A further object of the invention resides in the provision of a novel radar system having provision for pulse compression in the receiver of the system, as a function of the range from which target information is returning to the receiver.

It is a subsidiary object of the present invention to provide a novel arrangement for compressing radio frequency pulses.

It is another subsidiary object of the present invention to provide a system of pulse communication utilizing readily compressible pulses, and having a pulse receiver having means for variably compressing the pulses.

A further broad object of the invention resides in the provision of a system for controlling the effective duration of R. F. pulses internally of a pulse channel of a receiver.

The above and still further features, objects and advantages of my invention will become apparent upon consideration of the following detailed description of a specific embodiment thereof, especially when taken in conjunction with the accompanying drawings, wherein.

Figure 1:
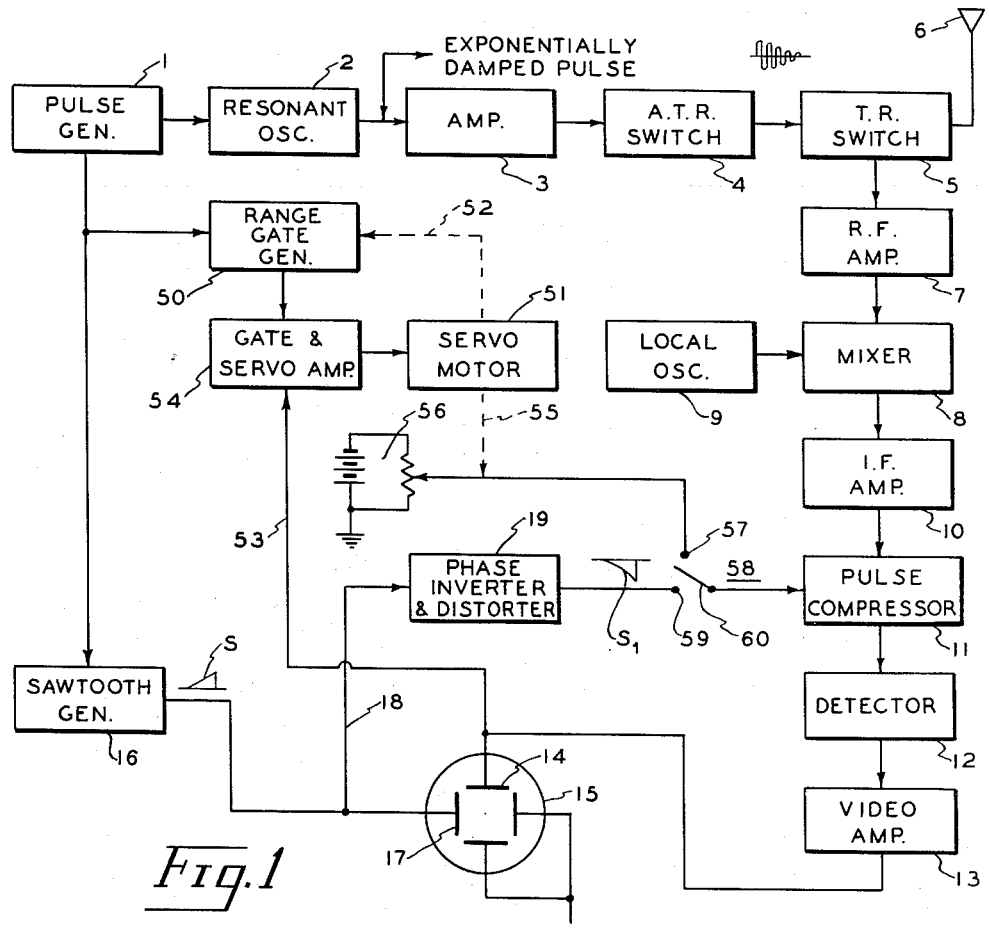
Figure 1 is a functional block diagram of a radar system in accordance with the present invention.

Referring now more particularly to the drawings, the reference numeral 1 identifies a pulse generator, which generates extremely short pulses, and of high amplitude. A suitable value might be .01 microsecond in a 10 cm. radar, for example. The impulses provided by the generator 1, serve to excite a resonant oscillatory circuit 2 having very low losses. A convenient device for accomplishing generation of a damped oscillatory wave is the well known coherent pulse oscillator, comprised of a parallel resonant circuit in series with a switching tube. The pulse permits current flow in the tube, and hence in the resonant circuit, and when the pulse terminates the energy stored in the circuit decays exponentially. Since a variety of suitable devices for the purpose are well known, per se, no specific device is illustrated herein.

The output of oscillator 2, i. e. an exponentially damped oscillatory wave, is amplified in amplifier 3, passed through an ATR switch and a TR switch 5, in accordance with practices well understood in the radar art, and transmitted via antenna 6 to a remote object for reflection therefrom as an echo signal.

Figure 2:
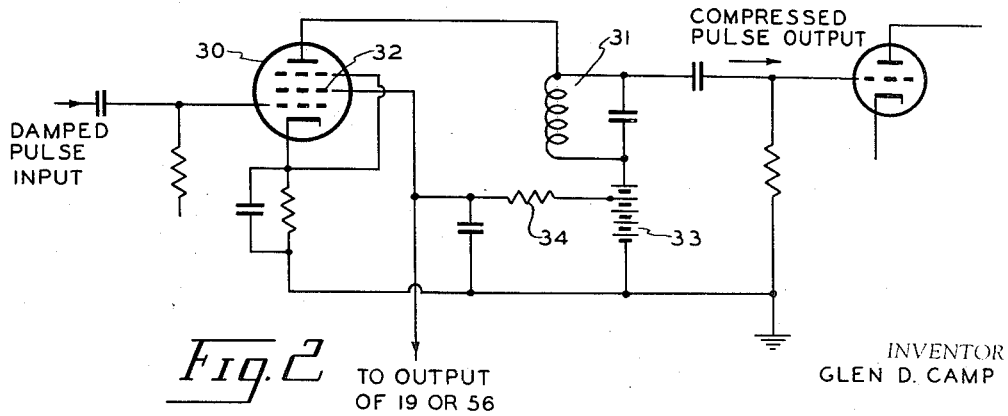
Figure 2 is a pulse compression circuit, in accordance with the present invention, and corresponding with one of the block elements of Figure 1.

The echo signal is returned from a remote target (not illustrated) and received by antenna 6, proceeding via T. R. switch 5 to radio frequency amplifier 7, for amplification, and thence to mixer 8, for frequency conversion by mixing with the output of local oscillator 9. The desired output component of the mixer 8 is selected in I. F. amplifier 10 and applied to a pulse length compressor 11, the specific character of which will be disclosed hereinafter, and which is illustrated per se in Figure 2 of the accompanying drawings.

The output of pulse compressor 11 is detected in detector 12, the detected pulse amplified to a suitable value in video amplifier 13, and the output of the latter applied to the vertical deflection electrode 14 of a cathode ray tube indicator 15.

The output of pulse generator 1 is applied to synchronize the output of a sawtooth generator 16, the sawtooth commencing in response to each pulse and enduring for a time proportioned to the maximum detection range expected of the equipment, in accordance with the current and usual practice. The sawtooth voltage deriving from sawtooth generator 16 is applied to produce recurrent horizontal scans across the face of cathode ray tube 15, by connecting the output voltage to the horizontal deflection electrode 17 of cathode ray tube 14.

The output of sawtooth generator 16 is also applied via lead 18 and polarity reverser 19 to the pulse compressor 11, where pulse compression takes place in accordance with the amplitude of the sawtooth voltage provided by the generator, i. e. as a function of range. The polarity reverser 19 may serve to provide distortion of the sawtooth output of the sawtooth generator 16, if this is necessary to obtain the desired overall system performance, i. e. $S/C=S/N$ at all ranges.

The radar system described hereinabove and illustrated in Figure 1 of the accompanying drawings may be designed for microwave operation, in which case the R. F. amplifier 7 may be designed for optimum response, i. e. optimum signal to noise ratio, it being well known that this involves a band pass in megacycles substantially equal to the reciprocal of the pulse length in microseconds, when rectangular pulses are employed. A similar, though not identical, relation between optimum R. F. band pass and pulse decay rate exists in the present system, and it is in fact feasible to design the system for optimum signal to noise ratio (S/N) at maximum range R. It is realized that signal to noise will then increase with decrease of range, at a very rapid rate, i. e. as $1/R^4$, where R is range.

Figure 4:
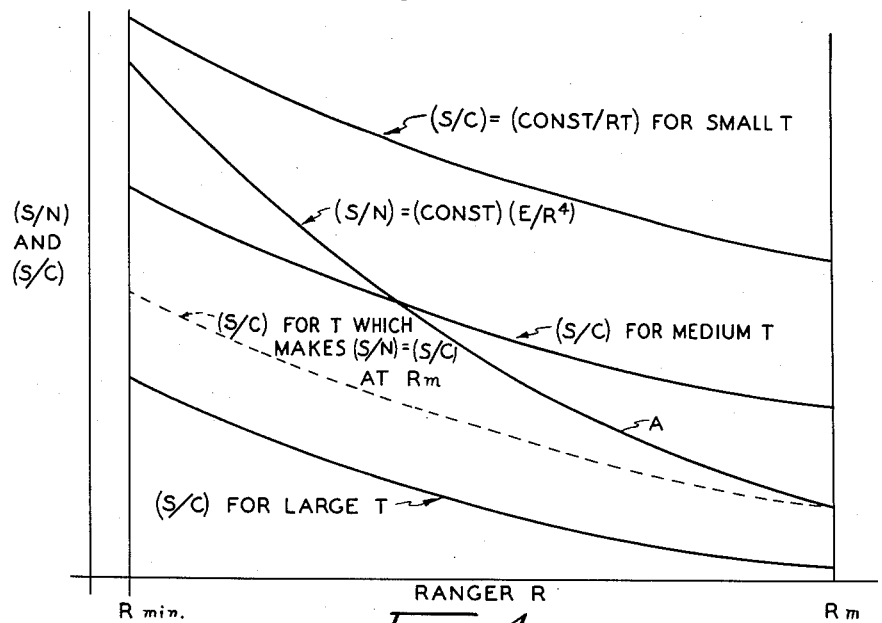
Figure 4 is a schematic plot of range against expected signal to noise and signal to clutter ratios, for a conventional radar system.

A plot of the dependence of S/N on R is provided in Figure 4 of the accompanying drawings. The dependence of the ratio S/C, signal to clutter, is also graphically indicated in Figure 4 for three values of pulse length T, and it is there indicated that for short pulse length signal-to-clutter S/C is high, while for large T, S/C is small, and a rough idea of the dependence of S/C on range is provided. It will be recalled in this connection that S/C for any given pulse duration is a function of range because at increased ranges radar beam divergence results in finding of more clutter targets. It has further been pointed out that increased pulse lengths also result in decreased S/C because a longer pulse returns more clutter echo simultaneously with desired target echo, since it finds clutter targets over a greater spread of ranges.

In accordance with a preferred embodiment of the present invention, I select a transmitter pulse duration, and a corresponding R. F. band width in the receiver of the system, which makes S/C and S/N equal at $R_{max}$, and which provides simultaneously the desired radar operating characteristics, such as minimum range, target discrimination, pulse energy, peak pulse power, maximum range, beam width, and the like.

I then decrease pulse length T as a function of range, in the radar receiver, so as to keep $S/N=S/C$ for all ranges, as nearly as possible, thereby obtaining the optimal combination of values for both S/N and S/C in a given radar equipment, operating under any set of conditions. It will be then noted that were it not for this operation the system would be clutter limited at all ranges except $R_m$, per the dotted graph.

To enable the required variation of T to be accomplished in the radar receiver in a simple and effective manner, I utilize especially shaped pulses, which lend themselves to pulse shortening, and I find that the simplest pulse of this character is a pulse having a vertical or impulsive rise, and an exponential decay. However, I do not wish to be understood as asserting that only pulses of such character may be employed in my system, since I realize that other pulse shapes may be suitable, and may in practice prove superior. For example, an approximately Gaussian curve, having a slow rise and a slow decay, may be employed.

It will be further realized, while I have disclosed the pulse compressor 11 as compressing pulses at intermediate frequencies, that the operation may be equally effective at radio frequencies, i. e. at a position in the receiver preceding the mixer.

I turn now to the question, what effect will pulse shortening in the receiver have on signal to noise and signal to clutter ratios, and demonstrate that pulse shortening will have very minor effect on S/N but a major effect on S/C, increasing S/C as a function of shortened pulse duration where T is defined as the time required for the pulse to decay to some arbitrary proportion of its initial value, say $1/e$, where $e$ is the natural logarithmic base.

During the time T when most of the energy $E_t$, deriving from the target, is arriving at the receiver, the clutter echoes will also be arriving, at some average rate $r$ per second. If the average energy in a clutter pulse is $E_c$, then the clutter energy during time T is $rTE_c$. It will be here realized that some of the clutter echoes will have commenced before T commences, but endure into T, while some will have commenced during T but endure after T terminates. These two classes of clutter signals approximately compensate one another, if only wave fronts of clutter signals are counted. Accordingly, the expectation value of the signal to clutter ratio is $$S/C = \frac{Et}{rTEc}$$

In this equation $rT$ is the total number of clutter pulses arriving in time T, since $r$ is clutter pulses per second, and T is time. $E_c$ is the energy in the target pulse and $E_t$ is the average energy in a clutter pulse. If now the time T is shortened, by causing the various pulses to decay more rapidly, to an infinitesimal time, $dt$, the total overlap in time of clutter pulses and target pulses will decrease to zero, in general. If T is finite, i. e. $\Delta T$, the total number of clutter pulses which overlap a signal pulse, during the time $\Delta T$ is decreased as the ratio $1/r\Delta T$. The average energy of each clutter pulse is decreased in the same ratio as the average energy of each signal pulse, but the number of overlapping, and hence interferring, clutter pulses is reduced. The ratio S/C is increased, accordingly, in the inverse ratio of the pulse durations.

It would appear, at first thought, that the ratio S/C could be made infinite by the simple expedient of reducing the time $\Delta T$ to the infinitesimal, i. e. by employing only the fronts of the incoming pulses to indicate targets and clutter.

It will be noted that the noise deriving from the R. F. stage of the radar receiver is derived in a relatively narrow band circuit, since the R. F. stage need only response to relatively long signal pulses. The stages of the receiver preceding the pulse compressor 11 may likewise be narrow band circuits. However, following the pulse relatively wide band circuits are required to handle the narrowed pulses produced. If the pulses are of impulse character the circuits must, theoretically, be of infinite width. There arises, therefore, the problem of noise in the circuits following the pulse compressor.

If all the noise were injected into the receiver system prior to all filters the signal plus clutter and the noise would have identical spectra, except that the phase of the former would be a smooth function of frequency whereas that of the latter would be a random function. In this case, any subsequent linear filters, including the circuit which produces a range-adjustable pulse duration, would have the same effect on the signal spectrum $s(t)$ and on the noise spectrum $n(t)$, and hence would leave the signal-to noise ratio S/N unchanged.

Figure 5:
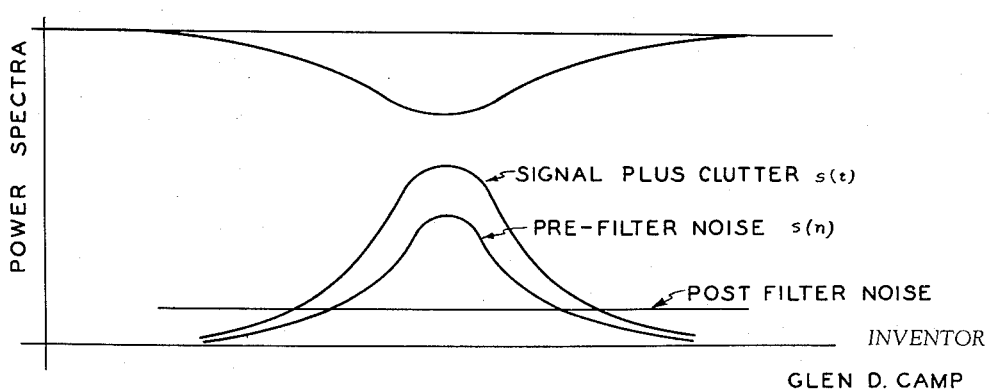
Figure 5 is a plot of power spectra of various signals and of noise, present in the receiver of the radar system of Figure 1.

In this connection reference is made to Figure 5 of the accompanying drawings, where a plot of a power spectrum of signal plus clutter $s(t)$, may be compared with a plot of prefilter noise $s(n)$, each plot being appropriately labelled. The plots of the power spectra of $s(t)$ and $s(n)$ are indicated as differing only by a constant factor, and hence when pulse length compression is applied, this part of S/N remains unchanged, involving merely a clipping of the sides of the spectra involved.

When post-filter noise is considered, however, in wide band circuits capable of handling shortened pulses, the amplitude of the noise spectrum may well exceed the value of the signal pulse clutter spectra at the skirts of the latter. This is illustrated in Figure 5, by indicating post-filter noise as having a constant value for all positions in the plot, that value crossing the prefilter plots.

It follows that compression of the pulses cannot be carried too far if S/N is not to decrease. However, this involves primarily a matter of choice, and if S/N can be permitted to decrease, correspondingly greater pulse compression may be employed.

We turn now to the problem of shortening the effective durations of oscillatory pulses having sharp rise but slow decays. A preferred way of solving the problem resides in the utilization of a constant current generator, such as a pentode amplifier, 30, Figure 2, driving an oscillatory circuit 31 having very small damping, so that it is susceptible to being set into oscillation in response to impulse excitation. The oscillatory circuit may, if desired, be designed for a slightly different frequency than the frequency of the input oscillatory pulses to the amplifier. These latter, having sharp rise times, shock excite the oscillatory circuit, giving rise to damped oscillatory waves. In addition the oscillatory circuit is driven, in steady state condition, in response to the input oscillatory pulses.

Figure 3:
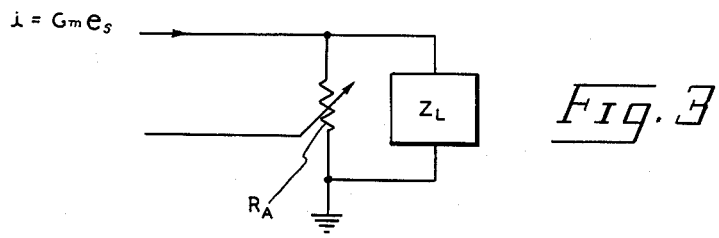
Figure 3 is an equivalent circuit for the actual circuit of Figure 2.

It is well known that when a pentode tube is utilized to drive a load circuit in response to a signal $e_s$, that the current $i$ flowing in the load circuit $Z_L$ is, for a given value of pentode internal resistance, $R_a$, proportional to the mutual conductance $G_m$ of the pentode. It is as if the pentode and its load were replaced by a constant current generator driving its current through the pentode internal resistance $R_a$ and the load impedance $Z_L$ in parallel. (See Figure 3.) This current is not dependent on $Z_L$.

It follows that the pentode causes a given current flow in the oscillatory load circuit, steady state, and that superposed on that steady state current is an oscillatory current caused by impulse excitation of the oscillatory load circuit. The sum of these two currents, if they start in phase, will be greater than that due to the driven current alone. The decay rate of the impulse excited oscillation is purely a function of the losses of the circuit, and hence may be adjusted to be rapid by varying $R_a$, the internal resistance of the pentode. The decay rate of the driven current is independent of these losses. Hence, the total current, in the form of a decaying pulse, may have a more rapid decay rate than does the driven oscillation because its decay time is the sum of two decay rates, the slow decay rate of the driven pulse and the rapid decay rate of the impulse induced pulse; and its initial value is the sum of the initial values of the driven and impulse induced pulses. It follows from this analysis that, by varying $R\alpha$, and hence the decay rate of the impulse excited oscillation, the decay rate of the total current in the load circuit may be decreased.

Clearly the same technique may be utilized to lengthen pulses, by reducing the decay rate of the impulse excited oscillations below that of the driven pulse.

The above analysis proceeds on the basis that the driven and impulse excited pulses are always in phase, which would be true if the natural frequency of the oscillatory circuit is the same as that of the driven oscillations. Clearly, if the two frequencies are not identical, a progressive shift of phase will occur as between the impulse excited and driven oscillation, resulting in a net decay of the sum of the oscillatory currents due to their lack of phase coincidence. This net decay is clearly a maximum when the current are completely out of phase. Either type of operation may be employed in the practice of the invention.

In order to accomplish the objective of varying the rate of decay of the received pulses as a suitable function of range, it is necessary that the pulse compressing circuit compress pulses more and more as time proceeds, from zero time for a pulse compression cycle. This zero time coincides with transmission of each pulse, and the compression circuit must be controlled so that it will serve to compress more and more those pulses arriving at later and later times, i. e. returned from greater and greater ranges.

In this connection it will be noted that a sawtooth voltage S is available in the radar equipment for providing a time base in the cathode ray tube indicator of the system, and this may serve as a control voltage for the pulse compressor. Since the law connecting pulse compression with time may not be linear, or even simple, if S/N is to be equal to or nearly equal to S/C for all ranges, and under all conditions of radar operation, some sort of wave shaper (19) may be required properly to distort the sawtooth voltage prior to its application to the pulse compressor. It is considered to be within the expected skill of the engineer to provide the necessary distorting circuits (19), and none is disclosed herein for that reason.

It is known that a resistance $R_A$ in parallel to a tuned circuit is equivalent to a series resistance $R_s$ in the resonant circuit, the values of $R_A$ and the equivalent $R_s$ being inversely proportional. In the present case the plate resistance of the pentode provides the resistance $R_A$, and as it becomes smaller serves to insert an equivalent resistance in series with the tuned circuit which becomes greater and greater, resulting in a greater and greater decrement or decay rate for the circuit. Hence, in the present system it is required merely to decrease the plate resistance of the pentode in response to the negative going sawtooth voltage $S_1$ outgoing from inverter and distorter 19 to at least approximate closely the desired result. It is known that a decrease of screen voltage decreases the value of $R_A$.

Hence the use of the inverter and wave shape distorter 19, to provide sawtooth waves $S_1$ of proper polarity for application to the screen grid 32 of pentode 30, the waves $S_1$ being applied to screen grid 32 superposed on the D.-C. operating voltage supplied by voltage source 33. This superposition may readily be effected by applying the output of inverter to wave distorter 19 directly to screen grid 32 of pentode 30, but connecting the screen grid to its normal point on voltage source 33 via a resistance 34, which permits the voltage of screen grid 32 to vary with respect to the steady voltage of the source 33.

Should it be desired to utilize the present invention in a range tracking radar system the servo of the system may be employed to set a desired control voltage into the range compressor, to maintain $S/C=S/N$ for the particular range being tracked.

In this connection, a range gate generator 50 may be driven in response to pulses provided by pulse generator 1, the range established being that determined by the position of a servo 51, via linkage 52, by control of the timing of the gate pulse output of the range gate generator 50. The output of the video amplifier 13 is applied, via lead 53 to the input of a gate and servo-amplifier 54, to which is also applied the output of the range gate generator 50, for purposes of comparison. The output of the gate and servo-amplifier 53 is then a function of the relative time positions of the outputs of video amplifier 13 and range gate generator 50, and is applied to control the position of the servo motor 51 in such sense as to make these time positions the same. The position of the servo motor 51 is then representative of range, during range tracking, and may be utilized to control, via linkage 55, the voltage output of a potentiometer 56. The latter is applied to a terminal 57 of a two position switch 58, having a further terminal 59 connected to the output of phase inverter and distorter 19, and the positionable arm 60 of which is connected to pulse compressor 11.

Accordingly, the position of the arm 60 determines whether the control voltage applied to pulse compressor 11, to determine the degree of pulse compression accomplished therein, shall be a relatively steady D.-C. voltage representative of a range being tracked, and variable in correspondence with that range, or whether that voltage shall be a modified sawtooth capable of applying variable compression for all ranges, as a repetitive function of time.

It will be clear that with arm 60 of switch 58 in contact with terminal 57, if the servo 51 is disabled, or disconnected from potentiometer 56, that the voltage output of the latter may be controlled manually, and set to any one desired range in this way.

In a practical system, it will be clear that the potentiometer 56 will be properly tapered to provide the required law of variation of control voltage output therefrom as a function of range.

It will also be clear that suitable provision is required for varying the distortion introduced into sawtooth S by phase inverter and distorter 19, as required by the type of clutter encountered, or by other operational conditions.

While I have described a preferred embodiment of the present invention in accordance with the requirements of the statutes, it will be clear that variations of the specific circuits disclosed may be resorted to, and rearrangements of the system, without departing from the true spirit of the invention as defined by the appended claims.

What I claim and desire to secure by Letters Patent of the United States is:

1. A distance measuring system, comprising means for generating successive oscillatory pulses having low decay rates, means for transmitting said pulses to a target for return therefrom, means for receiving said pulses when returned from said target, and means included in said means for receiving for increasing the effective decay rates of said oscillatory pulses.

2. The combination in accordance with claim 1 wherein said means for increasing the decay rates of said oscillatory pulses includes an oscillatory circuit having low damping, means for exciting said oscillatory circuit having low damping in driven mode and in shock excited mode in response to said oscillatory pulses, the indicial admittance of said oscillatory circuit such that the sum of said modes provides a damped oscillatory wave of higher decay rate than said first mentioned low decay rate.

3. The combination in accordance with claim 1 wherein said means for increasing the decay rates of said oscillatory pulses comprises a constant current generator driven in response to said oscillatory pulses, said constant current generator having a load circuit comprising a low loss oscillatory circuit tuned at least nearly to the oscillatory frequency of said oscillatory pulses.

4. A distance measuring system, comprising, means for generating oscillatory wave pulses of low decay rate, said means comprising a low loss oscillatory circuit and means for shock exciting said low loss oscillatory circuit, means for transmitting said pulses to a target for return therefrom, means for receiving the pulses returned from said target, said means for receiving comprising means for increasing the decay rate of said oscillatory wave pulses.

5. The combination in accordance with claim 4 wherein said means for increasing the decay rate of said oscillatory wave pulses comprises a constant current generator driven by said oscillatory wave pulses, and a load circuit for said constant current generator comprising a low loss oscillatory circuit tuned at least nearly to the frequency of said first mentioned oscillatory wave pulses.

6. A system for distance measuring in terms of transmission time of pulses, comprising means for transmitting to a target recurrent pulses having a predetermined effective pulse duration, for return from said target as echo pulses, means for receiving said echo pulses, and means for shortening the effective pulse duration of said echo pulses as a function of the range of said target.

7. A system for improving the signal to clutter ratio of a pulse type distance measuring equipment, comprising, means for transmitting pulse signals recurrently to a target for reflection from said target as echo pulses, means for receiving said echo pulses, said means for receiving providing a predetermined law of variation of signal to clutter ratio with range of said target, and means for varying the signal to clutter ratio of said system as a function of range of said target to establish at least approximate correspondence of said signal to clutter ratio and said signal to noise ratio for a relatively large number of values of range.

8. A system for distance measuring in terms of transmission time of pulses, comprising means for transmitting pulses to a target, means for receiving said pulses from said target as echo pulses, and means for controlling the effective durations of said echo pulses as a function of range of said target.

9. In a pulse communication system, means for transmitting pulses, means for receiving said pulses, and means, included in said means for receiving said pulses, for changing the effective duration of said pulses in accordance with the value of an unpredictable parameter of said system.

10. A system for distance measuring in terms of transmission times of oscillatory pulses, comprising, means for transmitting wave energy pulses having rapid rise times and slow decay times to a target for return from said target as echo pulses, a receiver for said echo pulses, said receiver comprising means responsive to said echo pulses for generating further oscillatory pulses having rapid rise times and controllable decay times, and means for controlling said controllable decay times comprising voltage waves each initiated in synchronism with one of the transmitted wave energy pulses and varying in amplitude as a function of travel time of said transmitted wave energy pulses.

11. The combination in accordance with claim 10 wherein is further provided a cathode ray tube indicator, means for detecting said further oscillatory pulses and for utilizing the detected pulses to generate visual indications on said cathode ray tube indicator, and means responsive to said voltage waves for generating a range representative time base in said cathode ray tube indicator.

12. The combination in accordance with claim 10 wherein said means for controlling said controllable decay times comprises a constant current generator driven in response to said echo pulses, and a low loss oscillatory circuit connected as a load for said constant current generator, said low loss oscillatory circuit having at least nearly the same resonant frequency as the oscillatory frequency of said pulses, and having losses sufficiently low to enable self oscillations in response to impulse excitation.

References Cited in the file of this patent

UNITED STATES PATENTS

| | | |
|---|---|---|
| 2,280,226 | Firestone | Apr. 21, 1942 |
| 2,419,576 | Levy | Apr. 29, 1947 |
| 2,536,346 | Bradley | Jan. 2, 1951 |
| 2,568,441 | Fyler | Sept. 18, 1951 |
| 2,578,253 | Lawrence | Dec. 11, 1951 |
| 2,590,836 | Andrew | Apr. 1, 1952 |
| 2,592,611 | Simon et al. | Apr. 15, 1952 |
| 2,624,876 | Dicke | Jan. 6, 1953 |